Nov. 4, 1969 C. W. LEATH ET AL 3,476,910
WIRE HEATER TEMPERATURE RECORDING AND CONTROL DEVICE
Filed Feb. 19, 1968 3 Sheets-Sheet 1

INVENTORS
MYRON R. WALDMAN
COLIN W. LEATH
THOMAS E. VALLANTE
BY
ATTORNEY

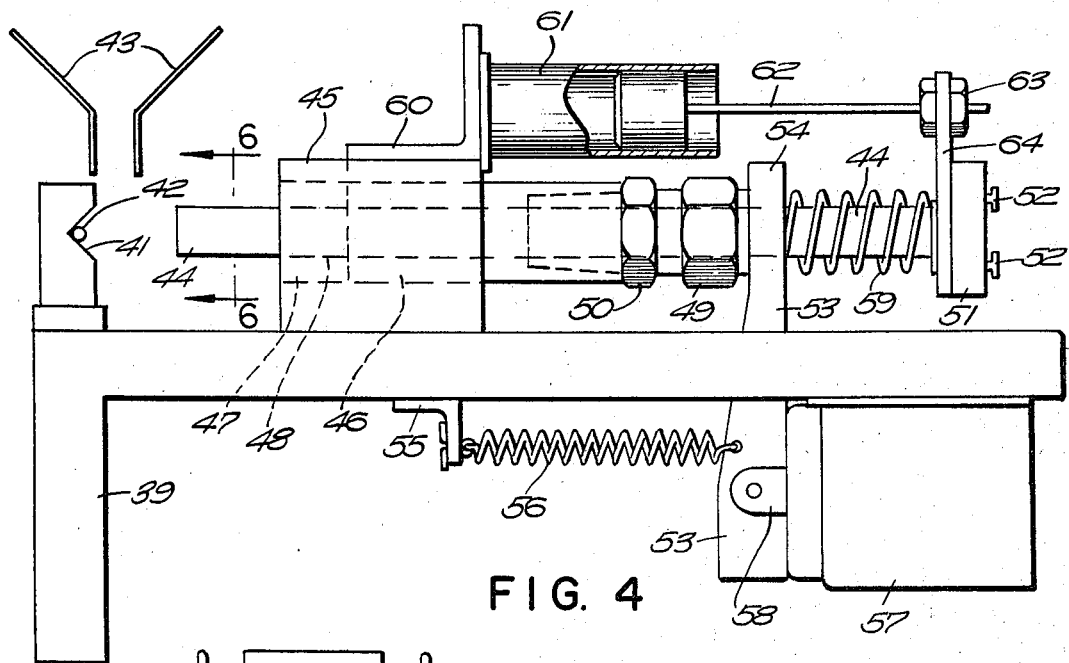
FIG. 4
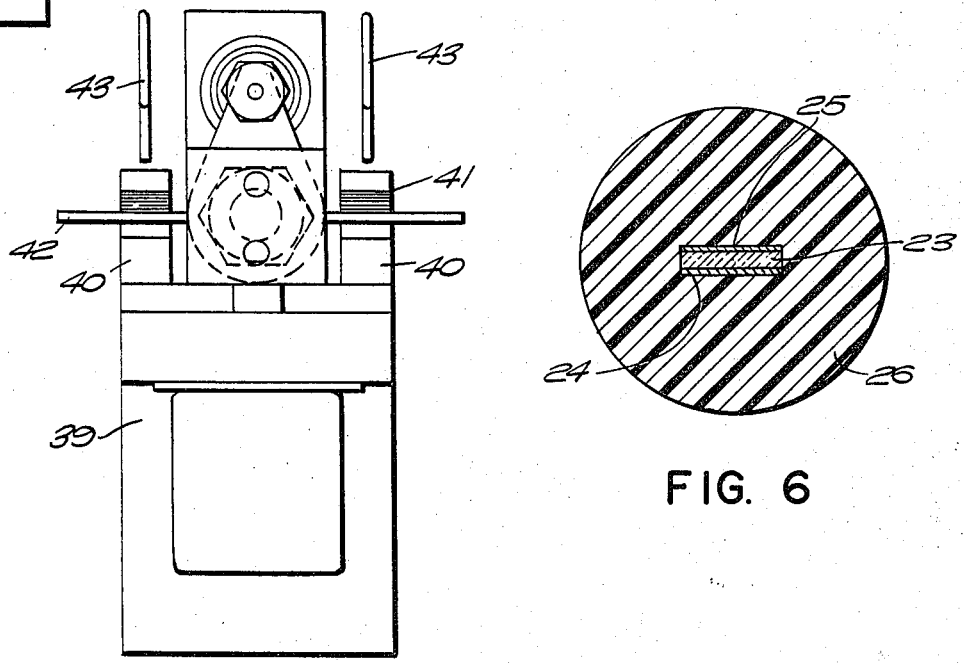
FIG. 5
FIG. 6
INVENTORS
MYRON R. WALDMAN
COLIN W. LEATH
THOMAS E. VALLANTE
BY
ATTORNEY

United States Patent Office 3,476,910
Patented Nov. 4, 1969

1

3,476,910
WIRE HEATER TEMPERATURE RECORDING AND CONTROL DEVICE
Colin W. Leath, Centredale, Myron R. Waldman, Providence, and Thomas E. Vallante, East Providence, R.I., assignors to Walco Electric Company, Providence, R.I., a corporation of Rhode Island
Continuation-in-part of application Ser. No. 556,944, June 13, 1966. This application Feb. 19, 1968, Ser. No. 706,320
Int. Cl. H05b 1/00, 3/00; C21d 9/62
U.S. Cl. 219—155                 9 Claims

ABSTRACT OF THE DISCLOSURE

The device is provided with spaced guides for a moving heated wire or similar element. A thermocouple element with an abradable face is pressed against the heated wire or element with a constant pressure provided by a negator spring. The temperature is recorded on a millivolt meter and the impulse can be used in a control circuit to control the temperature.

---

This application is a continuation-in-part of a copending application of Myron R. Waldman and Colin W. Leath, entitled Wire Heater Temperature Control Device, Ser. No. 556,944, filed June 13, 1966.

Our present invention relates to heating devices, and more particularly to a thermocouple device for measuring the temperature of a moving element.

The principal object of the present invention is to provide a method and means of sensing the temperature of a moving element and for controlling the temperature while it is so moving.

Another object of the present invention is to provide a temperature indicator for a heated element passing through a preheating device.

A further object of the present invention is to provide a sensing head for a thermocouple assembly which is designed to erode with the friction of contact with a moving element, such as a wire, and which provides a constant tension of the sensing head on the hot moving element.

Another object of the present invention is to provide a sensing and control device suitable for a preheater or for an annealing unit.

A further object of the present invention is to provide a temperature recording unit and a control unit for a moving heated element, which is simple in construction and easy and economical to manufacture and assemble.

With the above and other objects and advantageous features in view, our invention consists of a novel arrangement of parts more fully disclosed in the detailed description following, in conjunction with the accompanying drawings, and more particularly defined in the appended claims.

In the drawings:

FIG. 4 is a side elevation, partly in section, of a fixed type sensing head embodying our present invention;

FIG. 5 is a rear end view thereof;

FIG. 6 is an enlarged section taken on line 6—6 on FIG. 4;

2

Figure 8:
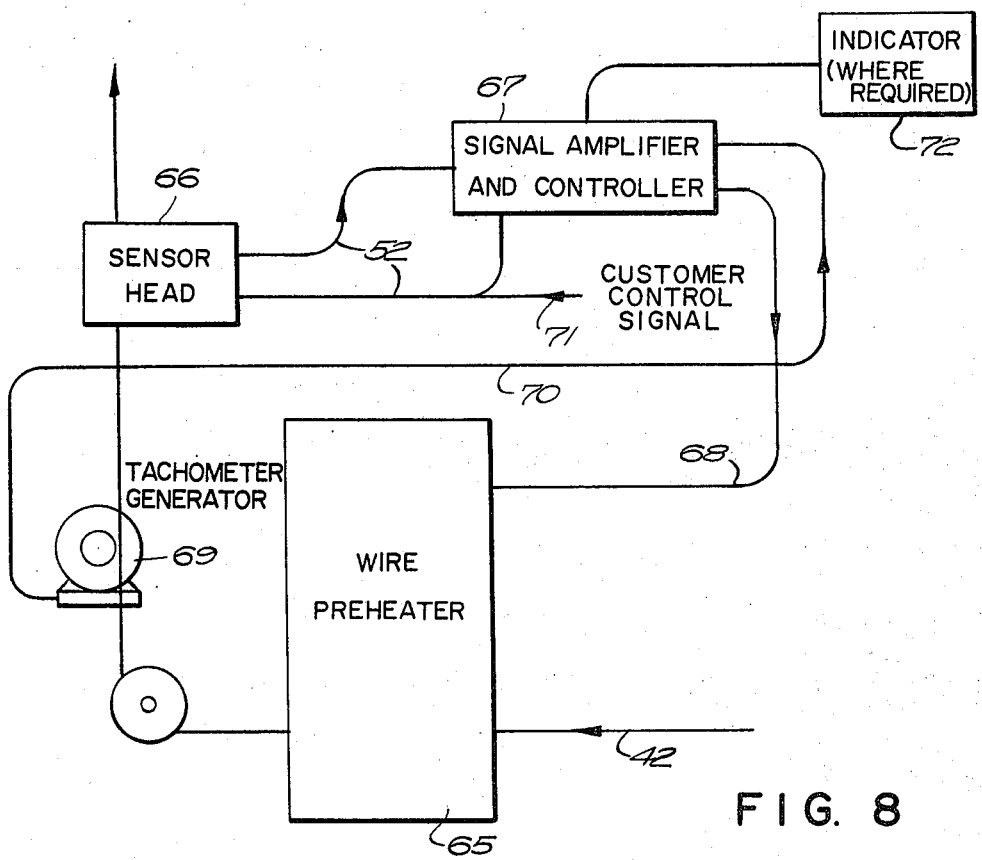

FIG. 8 is a wiring diagram using the unit shown in FIG. 4.

The present invention has particular adaptability for use with a brushless wire preheater illustrated in Peltier Patent No. 3,117,209, issued Jan. 4, 1964. In the manufacture of electrical conductor wire, it has been customary to cover the wire with a plastic material as a substitute for the conventional rubber cover heretofore used. To permit proper setting of the plastic material over the copper wire it is necessary that the wire be heated to approximately the temperature of the plastic material so that both will cool together. This requires that the copper wire be preheated before entering the coating die to temperatures of between 250 to 300 degrees Fahrenheit. The device illustrated in the patent above referred to is used for this purpose. However, since there are variations in the speed of the wire through the particular die and also variable controls are provided in the coating device, it is essential that some method of controlling the heat be also provided else the wire will either be under heated or over heated and possibly burnt out.

The device is, of course, also applicable to the heating in motion of any other element, whether in wire or strip form. In most cases, the temperature can be measured and then controls can be manually operated to correct any variations in the desired temperature. Where temperature is critical the sensing head is coupled with a control device for reading the temperature of the wire and maintaining this temperature during the various speeds of operation. The device shown in the above patent can also be used with the annealing of aluminum wire. In such cases the temperature involved range between 500 and 700 degrees F. Since the annealing temperatures are more critical than preheating of copper wire, it is essential that some form of control be utilized to maintain the proper temperature at whatever speed the wire is being run. Therefore, while the control device of the present invention is applicable to both preheating and annealing it is particularly advantageous during the annealing operation.

Figure 1:
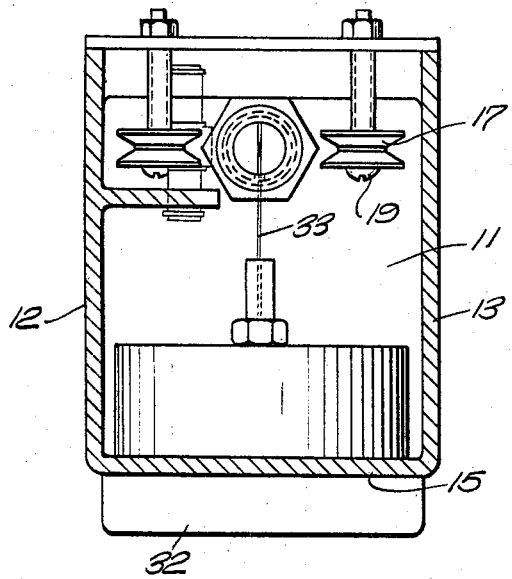
FIG. 1 is a front elevation of a portable heat sensing and recording device embodying our present invention, with the front housing wall removed.
Figure 2:
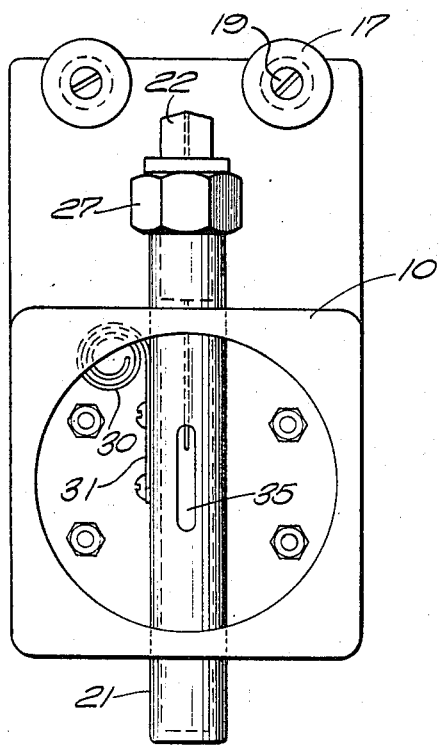
FIG. 2 is a top plan view thereof, with the top of the housing removed.
Figure 3:
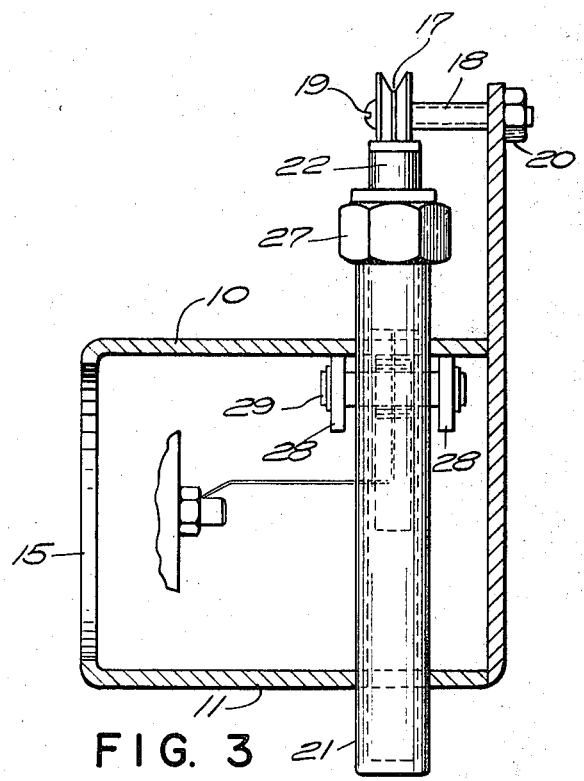
FIG. 3 is a side elevation thereof, with the side of the housing removed.

FIGS. 1, 2 and 3 illustrate a sensing and temperature recording device which is portable, permitting the operator to use it to check the temperature and then remove it. It is preferably mounted in a cast aluminum housing having a front wall 10, rear wall 11, side walls 12 and 13, and top wall 14 and bottom wall 15. As can be seen in FIGS. 2 and 3, the top wall 14 extends integrally forwardly to form a rectangular base 16.

Mounted adjacent the outer edge of the base 16 are a pair of spaced grooved wheels 17. Each wheel 17 is rotatably mounted on a post 18, and held thereon by a bolt 19 extending through the post 18 and base 16 and fastened by a nut 20. The grooved wheels 17 are made of a ceramic material called heanium which is dielectric and heat resistant.

A tubular housing 21 is slidably mounted in suitable openings in the front wall 10 and rear wall 11 in spaced parallel relation to the top wall 14, see FIGS. 2 and 3. The sensing head 22 is constructed as illustrated in FIG. 6. A strip of mica 23 is provided at one side with a strip of iron 24 and on the opposite side with a strip of metal comprising a copper and nickel mixture 25 which is known in the trade as constantan. This bi-metallic element forms a thermocouple. The unit is embedded in an asbestos-phenolic body 26. When the front end contacts a moving heated element passing through the grooves of the wheels 17, an eroding action occurs so that the metal particles bridge the gap formed by the mica and become a "ground weld" to provide the necessary temperature reading. The body 26 and the thermocouple thus erode under the friction of the moving element or wire. However, the device provides for the continued contact under a constant pressure.

The sensing head 22 extends from its tube 21 and is adjustably retained by a conventional friction gripping device 27, which permits axial adjustment of the sensing head 22 in the tube 21. A pair of spaced lugs 28 are mounted on the wall 10 (FIG. 3) and carry a shaft 29 on which a negator spring 30 is coiled. The free end 31 of the spring 30, is mounted along the tube 21 parallel to its axis (FIG. 2). Thus, the spring 30 exerts a constant force on the tube 21 and the sensing head 22 toward the element or wire between the wheels 17 (upwardly in FIG. 2).

A suitably calibrated millivolt meter 32 is mounted through the wall 15 and connected to the thermocouple by a wire 33 extending from a post 34 through a slot 35 in the tube 21. The entire unit may be provided with a spring clip 36 for carrying on a belt.

Figure 7:
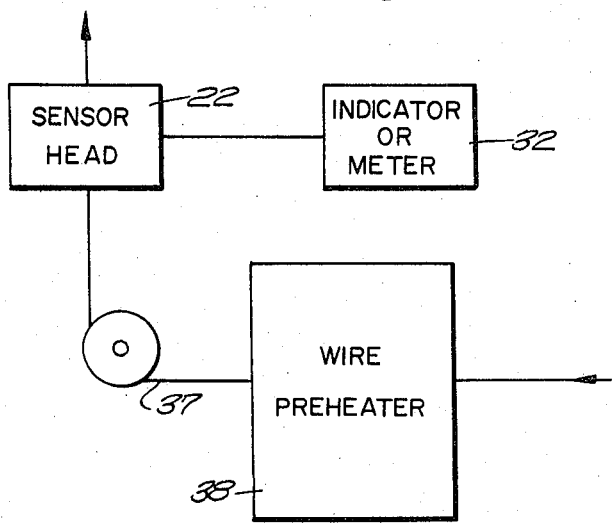
FIG. 7 is a wiring diagram of the unit shown in FIG. 1.

The unit is small and easily portable and provides a quick and easy means of making an accurate, contact, temperature reading of a moving heated wire or element. FIG. 7, diagrammatically illustrates the simple hookup. The wire or element 37 passes through the preheater 38 and the sensing head 22 permits a quick reading on the meter 32.

Where control is also required, the construction shown in FIGS. 4, 5, 6 and 8, are used. Applicants have found that an accurate reading can only be made with a direct contact as in the form shown in FIG. 1. The control device is, therefore, also so constructed. Mounted at one end, the left end in FIG. 4, of a base 39 are a pair of spaced blocks 40 of ceramic material each having a V-shaped cut out 41 in its face for receiving the wire 42 passing therethrough. The use of ceramic material similar to the wheels 17 permits a smooth surface offering the least resistance to the passage of the wire 42 together with its ability to withstand the heat of the wire. Mounted above and in front of the blocks 40 are a pair of wire insertion guides 43 forming a Y-shape so that the wire can easily and quickly be inserted in the blocks.

The sensing head 44 is constructed as illustrated in FIG. 6 and hereinabove described. The temperature sensor is mounted for horizontal movement by means of a block 45 mounted on a base rearwardly of the wire 42 and provided with an enlarged bore 46 of greater diameter than the sensor head. A smaller block 47 is mounted at the front end of the bore 46 and is provided with a central bore 48 adapted to receive the sensor and to hold it in proper position. Extending rearwardly the sensor is surmounted by an assembly 49 adapted to conventionally grip the elongated sensor 44 and frictionally adjust its forward movement by movement of the member 50. The sensor 44 extends rearwardly and terminates in a dielectric block 51 having the cord lead connections 52 for receiving the signal.

Movement of the sensor 44 forwardly against the wire 42 is accomplished by the construction further illustrated in FIG. 4. A vertical operating arm 53 is provided with a forked upper end 54 which surrounds the sensor 44 behind the assembly 49. The vertical arm 53 extends through a suitable slot in the base 39 (not shown). Mounted beneath the base 39, forwardly of the arm 53 is a bracket 55. A negator spring 56 is mounted with one end locked in the bracket 55 and the opposite end attached to the vertical arm 53. The negator spring provides a constant force pulling the arm 53 forwardly so that its upper end 54 pushes the assembly 49 and the sensor frictionally grasped by the member 50 forwardly against the wire 42. The characteristics of the spring 56 are such that regardless of the position, a constant force is exerted by the spring. As a result, as the front end of the sensor 44 wears away, pressure of the sensor on the moving wire 42 will always be constant. Retraction of the sensor is controlled by a solenoid 57 mounted beneath the base 39 to the right in FIG. 4. The solenoid 57 is provided with an operating arm 58 tightly mounted on the vertical arm 53. A coil spring 59 surrounds the sensor head 44 between the upper end 54 of the arm 53 and the rear assembly of the sensor head. In addition to the foregoing, a bracket 60 is mounted on the block 45 and an adjustable pneumatic dash pot 61 is mounted thereon with its piston arm 62 locked at 63 to a vertical plate 64 surrounding the rear of the sensor 44 between the end block 51 and the spring 59.

With the parts thus assembled, it is obvious that the function of the spring 59 and the dash pot 61 is to prevent violent and rapid movements of the sensor 44. In the position illustrated in FIG. 4, the solenoid 57 has retracted so that the front end of the sensor 44 is away from the wire 42 and the spring 56 has been stretched. Now when it is desired to move the sensor forwardly against the wire, the solenoid 57 is deactivated and the spring 56 then takes over and moves the arm 53 to the left which in turn causes its top forked end 54 to move the assembly 49 and slide the sensor 44 through the block 47 until it touches the wire 42. This movement is controlled by the dash pot 61 to prevent a quick and violent snap of the sensor head against the wire. The action is slow. Conversely, when it is desired to withdraw the sensor head, the solenoid 57 is actuated and its arm 58 tends to pull the operating arm 53 to the right against the action of the spring 56. This action may be quite rapid. However, since the only connection at this point between the upper part of the arm 54 and the sensor head 44 is through the spring 59 the quick action of the solenoid 53 results in a fast compression of the spring 59 and then a slow movement of the assembly outwardly into the position shown in FIG. 4 against the slowing action of the dash pot 61. Thus the combination of the spring 59 and the dash pot 61 controls the reciprocation of the sensor head 44. In either direction the action cannot be too fast.

The pressure of the spring 56 causing the pressure of the sensor 44 on the wire 42 is of course predetermined by the spring itself. Applicants have found that an extremely light touch gives a variety of readings whereas a heavier pressure increases the accuracy of the readings but also increases the heat of friction between the sensor head end and the wire. After experimentation, applicants have found that an ideal pressure is that between three and five ounces. At this pressure the reading can be accurated calibrated and the friction caused by contact is minimal.

Now referring to FIG. 8, the method of use of the sensing device illustrated in FIG. 4 becomes apparent. A conventional wire preheater 65 is mounted so that the wire 42 passes therethrough in the direction of the arrows. The heated wire passes through the sensing device 66 which sends a signal to the connections 52 to a signal amplifier and controller 67. This automatically controls the current in the preheater through a line 68. Thus the temperature of the wire can automatically be set and controlled through the sensing head 66 and signal amplifier and controller 67. In annealing, the speed of the wire may also be a factor and the tachometer generator 69 may be used to sense the speed of the wire and signal through the line 70 to the signal amplifier and controller 67. Thus the control could be a combination of speed and temperature since higher speeds require higher temperatures for annealing and will cause greater friction at the sensing head. A customer control signal 71 can be imposed for moving the solenoid manually. Where required, the signal amplifier and controller can be equipped with an indicator 72 for indicating temperature or speed or both.

Therefore, by the use of the novel sensing head arrangement illustrated in FIG. 4, and the simple hookup illustrated in FIG. 8, an accurate and fine control can be maintained on the heat and speed of the wire either for preheating or for annealing. Because of the condition of the sensor head in direct contact with the wire accurate reading can be maintained.

Both devices, portable or stationary, provide an accurate, contact reading of the temperature of a moving heated element such as a wire. Furthermore, the stationary unit can easily be used for automatic temperature control where required. Other advantages of the present invention will be readily apparent to a person skilled in the art.

We claim:

1. A device for measuring the temperature of an electrically heated moving element comprising a base, spaced guides on said base for guiding the heated element transversely across said base, a tubular holder mounted for axial movement at right angles to the moving element, an elongated thermocouple mounted in said holder and having a sensing end, means for axially moving said holder and thermocouple toward the heated element, said means maintaining said sensing end against said element between said guides, a portable housing having front, rear, top, bottom and side walls, said rear wall extending integrally forwardly of said housing to form said base, said holder and thermocouple being axially movable through opposed openings in said top and bottom walls and parallel to said base, a coiled negator spring mounted in said housing and having its free end mounted on said holder, and a calibrated millivolt meter in said housing electrically connected to said thermocouple.

2. A device for measuring and controlling the temperature of an electrically heated moving wire, a base, spaced guides on said base for guiding the heated wire transversely across said base, a support mounted on said base and having a horizontal bore, an elongated thermocouple mounted in said bore and having a sensing end and cord lead wires at the opposite end for conveying the temperature reading, and means for reciprocating said thermocouple axially toward and away from the heated wire, said means maintaining said sensing end against said wire between said guides, said thermocouple comprising a ribbon of iron and a ribbon of a copper-nickel alloy separated by a ribbon of mica, said metallic and mica ribbons being embedded in an asbestos-phenolic body, said ribbons and body eroding with the frictional contact with said wire, said reciprocating means comprising a solenoid mounted beneath said base, an operating arm extending from said solenoid to said thermocouple through a slot in said base, said solenoid being activated to withdraw said thermocouple from the wire, a bracket mounted beneath said base, and a spring between said bracket and said solenoid operating arm for maintaining said thermocouple in contact with the wire when said solenoid is deactivated.

3. The device as in claim 2 wherein said spring is a constant pressure negator spring for maintaining said thermocouple against the wire with a predetermined constant pressure.

4. The device as in claim 2, wherein a coil spring surrounds the rear portion of said thermocouple and said solenoid operating arm bears against said spring for absorbing the shock of the movement of said arm when said solenoid is activated.

5. The device as in claim 3, wherein a coil spring surrounds the rear portion of said thermocouple and said solenoid operating arm bears against said spring for absorbing the shock of the movement of said arm when said solenoid is activated.

6. The device as in claim 5, wherein a dash pot is mounted on said support, and the outer end of the piston rod of said dash pot is linked to the rear of said thermocouple for showing and controlling the reciprocating movement of said thermocouple.

7. A device for measuring and controlling the temperature of an electrically heated moving wire, a base, spaced guides on said base for guiding the heated wire transversely across said base, a support mounted on said base and having a horizontal bore, an elongated thermocouple mounted in said bore and having a sensing end and cord lead wires at the opposite end for conveying the temperature reading, means for reciprocating said thermocouple axially toward and away from the heated wire, said means maintaining said sensing end against said wire between said guides, and a dash pot mounted on said support, the outer end of the piston rod of said dash pot being linked to the rear of said thermocouple for slowing and controlling the reciprocating movement of said thermocouple.

8. The device as in claim 7, wherein a coil spring surrounds the rear portion of said thermocouple and said reciprocating means bears against said spring for absorbing the shock of movement of said means.

9. A device for measuring and controlling the temperature of an electrically heated moving wire, a base, spaced guides on said base for guiding the heated wire transversely across said base, a support mounted on said base and having a horizontal bore, an elongated thermocouple mounted in said bore and having a sensing end and cord lead wires at the opposite end for conveying the temperature reading, means for reciprocating said thermocouple axially toward and away from the heated wire, said means maintaining said sensing end against said wire between said guides, and means for electrically heating said wire, the temperature reading from said thermocouple being transmitted to a signal amplifier and control device, said device controlling the current to said electrical heating means.

References Cited
UNITED STATES PATENTS

| | | | |
|---|---|---|---|
| 2,773,161 | 12/1956 | Baker | 219—155 X |
| 2,839,594 | 6/1958 | Schneidersmann | 136—229 X |
| 2,988,582 | 6/1961 | McGregor et al. | 136—221 |
| 3,311,734 | 3/1967 | Peterson | 219—155 X |

JOSEPH V. TRUHE, Primary Examiner

B. A. STEIN, Assistant Examiner

U.S. Cl. X.R.

136—221; 219—50